(12) United States Patent  
Kaplinger et al.

(10) Patent No.: US 8,903,754 B2  
(45) Date of Patent: Dec. 2, 2014

(54) PROGRAMMATICALLY IDENTIFYING BRANDING WITHIN ASSETS

(75) Inventors: Todd E. Kaplinger, Raleigh, NC (US); Eric Woods, Durham, NC (US)

(73) Assignee: International Business Machines Corporation, Armonk, NY (US)

(*) Notice: Subject to any disclaimer, the term of this patent is extended or adjusted under 35 U.S.C. 154(b) by 274 days.

(21) Appl. No.: 13/537,446

(22) Filed: Jun. 29, 2012

(65) Prior Publication Data

US 2014/0006327 A1    Jan. 2, 2014

(51) Int. Cl.
*G06N 5/02* (2006.01)
*G06Q 10/00* (2012.01)

(52) U.S. Cl.
USPC ............................................. 706/46; 705/1.1

(58) Field of Classification Search
None
See application file for complete search history.

(56) References Cited

U.S. PATENT DOCUMENTS

| | | | |
|---|---|---|---|
| 7,711,596 B2 | 5/2010 | Cristol | |
| 2007/0192170 A1 | 8/2007 | Cristol | |
| 2007/0208719 A1* | 9/2007 | Tran | 707/3 |
| 2009/0119153 A1 | 5/2009 | Cameron | |
| 2009/0254399 A1 | 10/2009 | Cristol | |
| 2010/0094763 A1* | 4/2010 | Frank et al. | 705/310 |
| 2011/0013843 A1* | 1/2011 | Seeber | 382/190 |
| 2011/0066648 A1 | 3/2011 | Abhyanker et al. | |
| 2011/0145072 A1 | 6/2011 | Christiansen et al. | |
| 2011/0145289 A1 | 6/2011 | Christiansen et al. | |

\* cited by examiner

*Primary Examiner* — Alan Chen
(74) *Attorney, Agent, or Firm* — Yee & Associates, P.C.; Parashos T. Kalaitzis

(57) ABSTRACT

An illustrative embodiment of a computer-implemented process reports identified items of interest associated with brand associated with an identity of an entity by generating a seed document containing criteria representative of items of interest associated with a brand of a selected entity, receiving, the seed document containing the criteria into a repository to initialize the repository, wherein the repository comprises information describing branding representative of the selected entity and analyzing selected source material using the criteria in the seed document in combination with the repository, by selectively applying adapters associated with specific types of content contained within the selected source material to perform analysis including semantic analysis and pattern matching. Responsive to the analysis, identifying a set of items of interest in the selected source material that meet the criteria representative of items of interest associated with the selected entity and generating a report.

20 Claims, 5 Drawing Sheets

FIG. 7
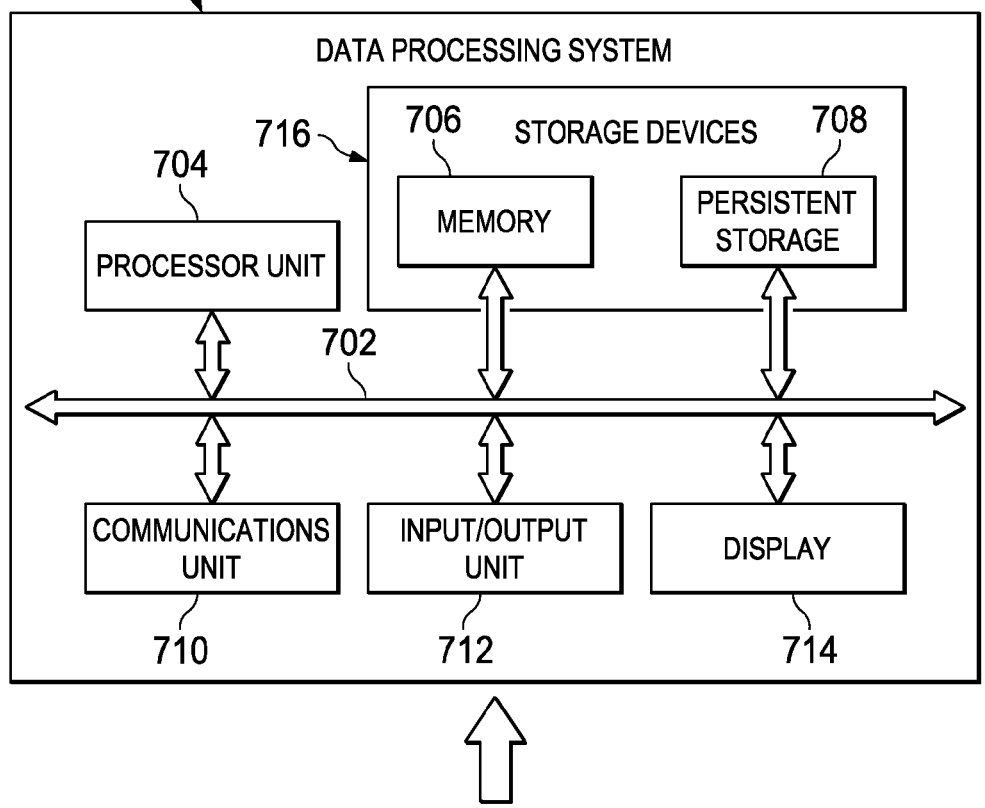
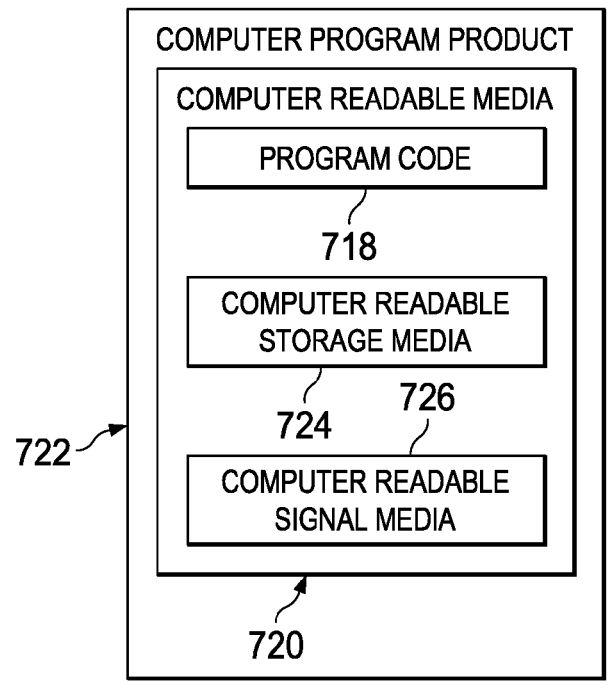

PROGRAMMATICALLY IDENTIFYING BRANDING WITHIN ASSETS

BACKGROUND

1. Field

The disclosure relates generally to a network data processing system and in particular, to programmatically identifying branding within assets in the network data processing system.

2. Description of the Related Art

When assets of a new product are acquired, the assets typically contain branding indicia representative of a company that previously owned the assets. The branding indicia of the previous owner must now be transitioned to the new owners to conform to the requirements of the company belonging to the new owners.

Branding indicia may appear in a variety of forms within a number of types of assets including program code, product and company documentation, and other marketing material including audio and video representations. Branding indicia typically appears in a number of formats including images, text, and graphics including logos, trademarks, slogans, catch phrases, and product names. Identifying, locating and transitioning the branding indicia is a major task for the acquiring company, and the task is mainly a manual process of discovery.

SUMMARY

According to one embodiment of the present invention, a process for identifying an item within a set of items associated with a brand associated with an identity, generates a seed document containing criteria representative of items of interest associated with a predetermined entity, wherein the items of interest are representative of brand indicia associated with an identity of the predetermined entity, receives the seed document containing the criteria into a repository to initialize the repository wherein the repository comprises information describing branding indicia representative of the predetermined entity. The process analyzes a selected source using the criteria in the seed document in combination with the repository, wherein the criteria defines a scope for the analysis and the analysis further includes selectively applying an adapter associated with a specific type of content contained within a portion of the selected source to perform analysis including semantic analysis and pattern matching. A result is generated wherein the result includes a set of identified items of interest; representative of the branding indicia associated with the identity of the predetermined entity, located in the selected source and reports the result to a requester.

BRIEF DESCRIPTION OF THE SEVERAL VIEWS OF THE DRAWINGS

FIG. 7 is a block diagram of a data processing system in accordance with an illustrative embodiment.

DETAILED DESCRIPTION

Figure 1:
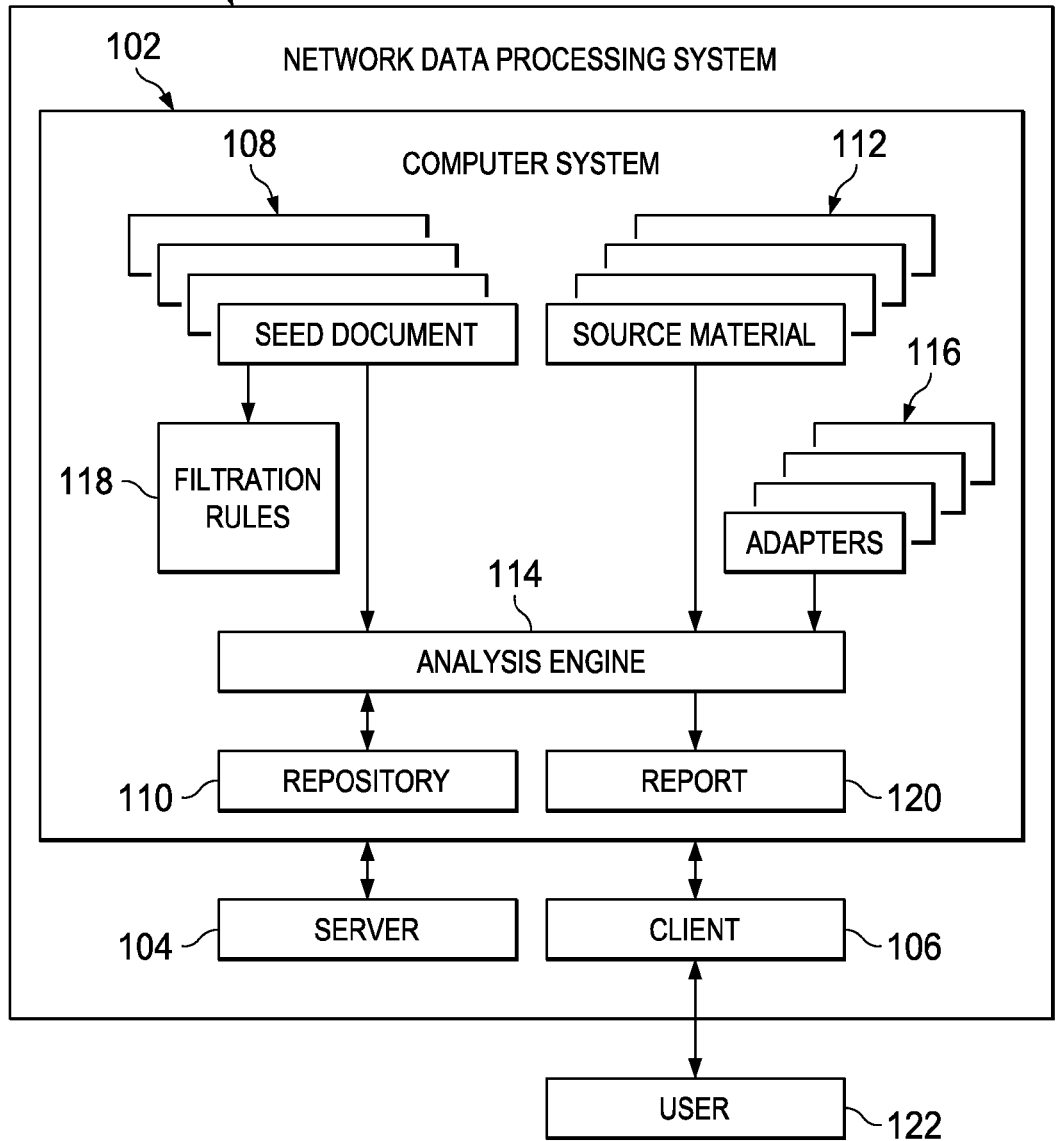
FIG. 1 is a block diagram of components involved in programmatically identifying branding within assets in the network data processing system in accordance with an illustrative embodiment.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable storage medium that can direct a computer, other programmable data processing apparatus, or other devices to function in a particular manner, such that the instructions stored in the computer readable storage medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Thus, one or more illustrative embodiments provide a process, apparatus, and computer program product for programmatic identification of branding items within assets. In one example, responsive to a computer generating a seed document, containing criteria representative of items of interest associated with a predetermined entity, the computer receives the seed document containing the criteria into a repository to initialize the repository. The computer analyzes a selected source, using the criteria in the seed document in combination with the repository, and generates a result, wherein the result includes a set of identified items of interest, representative of the branding identity of the predetermined entity, located in the selected source. The computer reports the result, to a requester.

With reference now to the figures and, in particular, with reference to FIG. 1, a block diagram of components involved in programmatically identifying branding within assets in the network data processing system is depicted in accordance with an illustrative embodiment. In this illustrative example, computer system 102 is present in network data processing system 100. Computer system 102 may comprise a set of computers. A "set," as used herein with reference to items, means one or more items. For example, "set of computers" is one or more computers. When more than one computer is present, for example server 104 or client 106 in computer system 102, those computers may be in communication with each other. This communication may be facilitated through a medium such as a network. This network may be, for example, without limitation, a local area network, a wide area network, an intranet, the internet, and some other suitable type of network.

Seed document 108 comprises a set of brand identifier information also referred to as branding indicia. Each set of items in the set of brand identifier information represents a seed document. The set of items in a specific seed document comprise a collection of branding information specific to an entity, for example a company, a product or a previously used collection of branding information. The elements within the seed document define the criteria associated with an instance of a brand to limit the scope of a search to only those items of interest as defined in the seed document. The items of interest are defined, within the current context of illustrative embodiments, as an element having a value of an attribute indicative of an association with a business entity. By way of a simple example, an item of interest comprises an element of entity name having an attribute value of A wherein the company name is A.

The elements therefore define a particular instance of branding indicia for a given selection or discovery task, wherein the set of items is tailored to a specific instance of a brand associated with a business entity. The items of interest are elements uniquely associated with and representative of a brand. The brand is a symbolic qualifier of a business entity. For example, a brand is also referred to as a corporate identity and typically includes formal identifiers comprising the company name, legal identifiers as used in intellectual property of the company including copyright and trademark material including the company name, as well as graphics including a corporate or product logo. A further example includes a marketing slogan associated with the company or product or product name as well. In another example a particular color combination may be specified as unique to a company as in a shade of red, or green or pink which historically has been used in a particular product line of a company.

Items of interest are therefore elements which have associated an attribute identifiable with an entity including a product or company. For example, a graphic used in search criteria has an attribute defined as a particular symbol which is associated with company A. When a graphic depicting the particular symbol, as an example of branding indicia, is located within a searched object, an association with company A can be presumed. In another example, when a name is used with a particular color and font representation the name is identified as a brand; however the same name without particular color and font representation is typical common everyday use and not associated with any entity and brand. Branding indicia therefore serve to identify and distinguish an element in a particular use case from a same element that is unparticular. A brand is therefore opposite to generic in a marketing environment. A set of items of interest accordingly defines a brand identity, wherein the set comprises one or more elements each of which is associated with an attribute identifiable with an entity, including a company, product or product line of a company.

Specific instances of indicia as contained within seed document 108 may appear in a variety of forms within a number of types of assets including program code, product and company documentation, and other marketing material including audio and video representations. A brand is a "Name, term, design, symbol, or any other feature that identifies one seller's good or service as distinct from those of other sellers." Source: The MASB Common Language Project. http://www.themasb.org/common-language-project/http://en.wikipedia.org/wiki/Brand. Brand and branding is also defined as "A brand is a customer experience represented by a collection of images and ideas; often, it refers to a symbol such as a name, logo, slogan, and design scheme. Brand recognition and other reactions are created by the accumulation of experiences with the specific product or service, both directly relating to its use, and through the influence of advertising, design, and media commentary." (Added definition) "A brand often includes an explicit logo, fonts, color schemes, symbols, sound which may be developed to represent implicit values, ideas, and even personality." Source: SEMPO and Wikipedia (both definitions cited in http://www.marketingpower.com/_layouts/Dictionary.aspx?dLetter=B)

Branding indicia typically appears in a number of formats including images, text, and graphics including logos, trademarks, slogans, catch phrases, and product names. Identifying, locating and transitioning the branding indicia are typically labor intensive large scale tasks. The tasks are typically required as a result of an acquisition of assets wherein the intent is to retain the assets but use with branding identifiable with the new or receiving company. In another example, the tasks may result from a decision to associate a new identity with existing assets, whereby the old branding indicia information is made to conform to the new identity.

The specific instances of branding indicia are collected using a set of processes and techniques ranging from manual input to scanning and digitizing of example information. The items of interest are associated with and define the identity of the predetermined entity using a policy for associating items of interest with branding indicia of predetermined entities. The policy typically includes type of source material to be included as representative of a collection of branding indicia as well as specific examples or targets used in a collecting exercise.

A policy further defines a matching flexibility used when determining whether a target must be an exact match or match to a lesser degree. For example, a particular slogan indicative of a brand may be entered manually as textual data to form a target test string. In another example an image in digital format may be captured. In another example, a set of trademark and copy right symbols may be collected, and further a set of keywords may be associated with the symbols indicative of a particular mark used in associated with a particular brand of interest. Other examples include the capture of audio and video information to be used as indicators of a particular brand.

Marketing materials and corporate information provide typical sources for the branding examples used to form the set of branding indicia for a specific task. Product presentation materials typical include digitized text files, or other ready to use document files depicting branding information useful for capturing and including in seed document 108.

The information when collected may be stored in a data storage device in computer system 102 in a number of formats including a file or database comprising a collection of information separated by format or type of information, or in some combination of entries as needed by an implementation. In one example, various types of branding indicia is collected into an extensible markup language tagged file in which type of information is tagged to indicate a respective type including text, image, sound, and graphic. In another example, the information may be separated into structured and unstructured data.

Metadata associated with each entry further defines an entry providing information used during processing the entry, for example to indicate a particular process to invoke to correctly process the associated data. For example, metadata describing a text entry is used to identify a particular encoding used, enabling an appropriate converter to be used to transform the input text into a canonical form when used in repository 110. Repository 110 does not require use of a canonical form for text but may enable such usage according to an installation practice.

Seed document 108, in one instance provides a specific set of computer readable criteria with which to initialize repository 110 comprises a set of brand information. For example, using company A, a seed document may contain elements of company name, company logo, product name and a marketing slogan for product B. Information in the seed document is extracted into repository 110 making the extracted data available as search criteria and accordingly initializing the repository with the instance data associated with company A. Each set of items in the set of brand information represents a seed document. There may be multiple seed documents present, each containing a predetermined configured collection of data elements indicative of a respective brand. A particular instance of seed document 108 may therefore also be created as needed in anticipation of use.

Repository 110 provides a capability of storing, managing and retrieving of data representative of an aggregation or a combination of data elements collected through processing of one or more sets of branding indicia. Further repository 110 is continually updated through processing of seed document 108 and source material 112 using analysis engine 114. Updating of repository 110 occurs during a refinement sub-process (described later) associated with analysis of source material 112. Repository 110 accordingly learns and grows proportionate with use and inclusion of new data and refinement.

Source material 112 represents a set of data to be analyzed. Source material 112 typically includes a collection of program code, documentation, marketing material, and audio and visual material. Each instance of source material 112 represents a collection of data associated with a specific seed document and therefore the same entity defining a scope of a search both in terms of the search criteria and the search objects. For example, when using seed document for company A, corresponding search material for company A is also used.

When source material 112 is not in a computer readable form, pre-processing is required depending upon a type of information provided. For example, a hard copy document will be scanned to produce a digitized format which may be further processed using object character recognition tools to output a textual representation of the document suitable for processing by analysis engine 114. Other processing may be required according to the format of the incoming portions of source material 112.

Analysis engine 114 provides a capability of performing deep semantic analysis and relevancy processing of input received in the form of source material 112 using training data provided as seed document 108. Processing of analysis engine 114 is further controlled using filtration rules 118 and adapters 116. Analysis engine 114 is an adaptive processor through use of selectable plug-ins in the form of adapters 116 responsive to a type of element to be processed within a portion of source material 112. Analysis engine 114 is also an adaptive processor through use of filtration rules 118 which may be selectively applied during processing of seed document 108 and source material 112 to refine results obtained. The analysis further includes processing comprising semantic analysis and pattern matching operations.

Capabilities of analysis engine 114 include contextual analysis to identify word usage as well as relevancy of words or phrases to manage conditions resulting in process results obtained that look like or sound like or appear to be similar to identified elements in source material 112. Analysis engine 114 accordingly does not only provide a search capability to identify an exact match of criteria with source material, but provides more than a simple search hit.

Adapters 116 provide a capability to enable analysis engine 114 to selectively apply a specific adapter for a portion of source material being processed. For example, when a graphic is encountered during processing of source material 112, analysis engine 114 selects an appropriated graphic analysis plug-in to use. Data being processed within analysis engine 114 therefore triggers selection of the proper tool for the data when and as needed.

Filtration rules 118 provide a capability to further refine processing within analysis engine 114. For example a rule identifies a level of match needed to capture and identify an element as a result in a set of identified elements. A rule is typically expressed as a condition-action pair. For example a match rule may be specified for a specific branding exercise or in general as a reference to exact, range or threshold, wherein exact means a duplicate, range indicates pair of values representative of a tolerance, and threshold indicates single value (which the result must be above or below). The value uses a probability of the identified source material element being the branding indicia of interest. In another example, equivalence may be specified such as when a numeral 2 may be substituted for the word two.

Rules may also provide patterns and logic to remove undesired characters from character strings used as search arguments. In another example, rule may be used to substitute characters, such as character c for a copyright symbol, wherein such substitution may be provided by a symbol table indicating a symbol and corresponding text variations to enable bidirectional mapping.

Rules further define associations and collocation sequences and distances. For example, a sequence of words used in a catchy slogan may occur in a slight variation but is captured though collocation settings to recognize possible slight variations, rather than an exact match or a false positive because the words are not typically used in the same manner.

Further flexibility is provided by prompting user 122 to respond with accepting or rejecting a specific result. Responsive to a user input, a relevancy value associated with an identified item may be increased or decrease causing the item to be saved or discarded respectively.

Report 120 provides the output of the processing of seed document 108 and source material 112 using analysis engine 114 in combination with repository 110, adapters 116 and filtration rules 118. Report 120 provides a capability to represent the processing results to a requester. The representation may be in form suitable to store in a data storage device or processed as a presentation form. The reported information represents the elements defined in the instance of seed document 108 that were identified and located in source material 112. Reporting also provides a link for each identified item of interest in a document of source material 112 in which the identified item was located.

Figure 2:
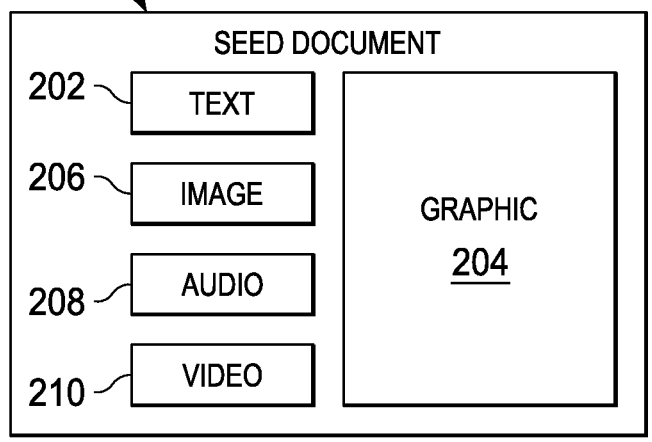
FIG. 2 is a block diagram of a logical representation of a seed document example, in accordance with an illustrative embodiment.

With reference to FIG. 2 a block diagram of a logical representation of a seed document example, in accordance with an illustrative embodiment is presented. Seed document 200 represents a logical view of components of seed document 108 of FIG. 1. Seed document 200, provides a specific set of computer readable criteria with which to initialize repository 110 of FIG. 1. The computer readable criteria comprise a set of branding information associated with a particular brand of interest. A particular instance of seed document 200 may therefore also be created as needed in anticipation of use.

Seed document 200 is a logical collection of asset data comprising one or more elements, each of which may be representative of a different category of asset. For example, seed document 200 as presented includes elements of text 202, graphic 204, image 206, audio 208 and video 210. A particular seed document does not necessarily contain all categories of elements but typically contains elements used to identify branding as required.

Seed document 200 is not limited to a document. Document as used herein represents a logical unit which may be a document, file, set of files or objects or data base tables or entries. The document is therefore a logical representation of a collection of artifacts defining a brand to enable a systematic search of assets contained within source material 112 of FIG. 1.

Figure 3:
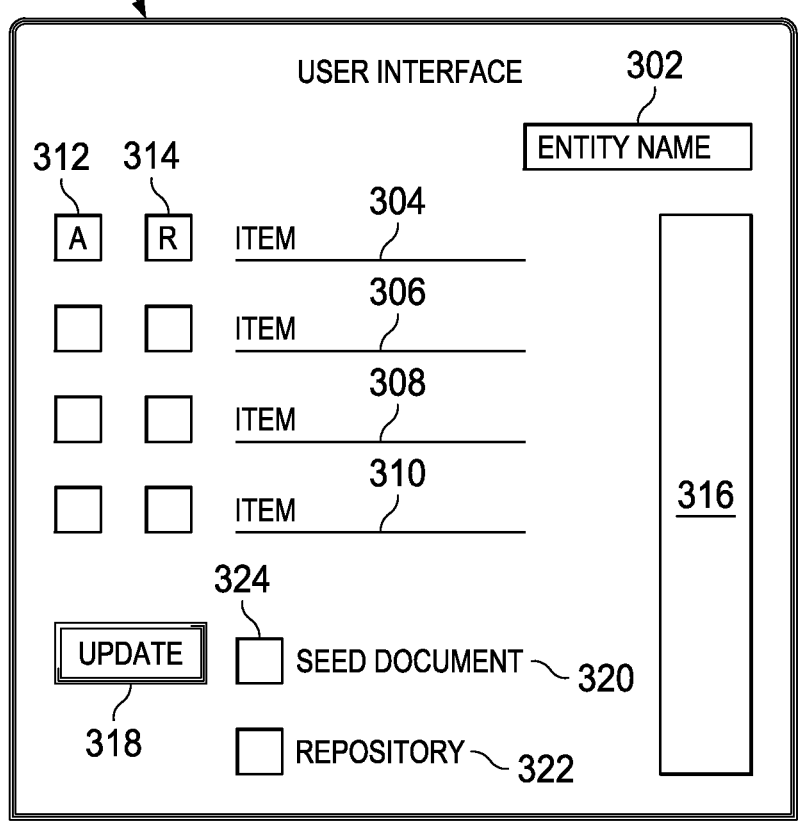
FIG. 3 is a block diagram of a user interface portion, in accordance with an illustrative embodiment.

With reference to FIG. 3 a block diagram of a user interface portion, in accordance with an illustrative embodiment is presented. User interface 300 is a simplified example of a user interface used to by a user to control processing in which a user may be prompted for and respond to information presented regarding elements representing branding information. For example, user interface 300 may be used to confirm input when creating seed document 200 of FIG. 2 or when confirming information after processing of source material 112 presented through report 120 of FIG. 1.

User interface 300 in the example depicts a display including entity name 302. Entity name 302 in the example represents a company or product associated with a brand identifier to be searched. Items 304, 306, 308 and 310 represent elements located during processing of source material.

A pair of boxes comprising box 312 and box 314 enables the user to indicate confirmation of an associated element. For example, by selecting box 312 for item 304 a user indicates acceptance of the item as presented. In a similar manner, by selecting box 314 for item 304 a user indicates rejection of the item as presented. The user interface elements depicted are not limited to those of the example. Alternatives include use of a default value with a user override, a check box, highlighting entries and other known selection techniques.

When a number of items exceed the display area of a screen an overflow condition arises and scroll bar 316 enabling the user to move through the entire list of elements. Upon completion of selecting items for processing a user selects update 318. A cancel option is also provided but not shown. Before selection of update is made, a user indicates whether the resulting update is made to seed document element 320 of repository element 322 by checking box 322 of a corresponding entry.

Figure 4:
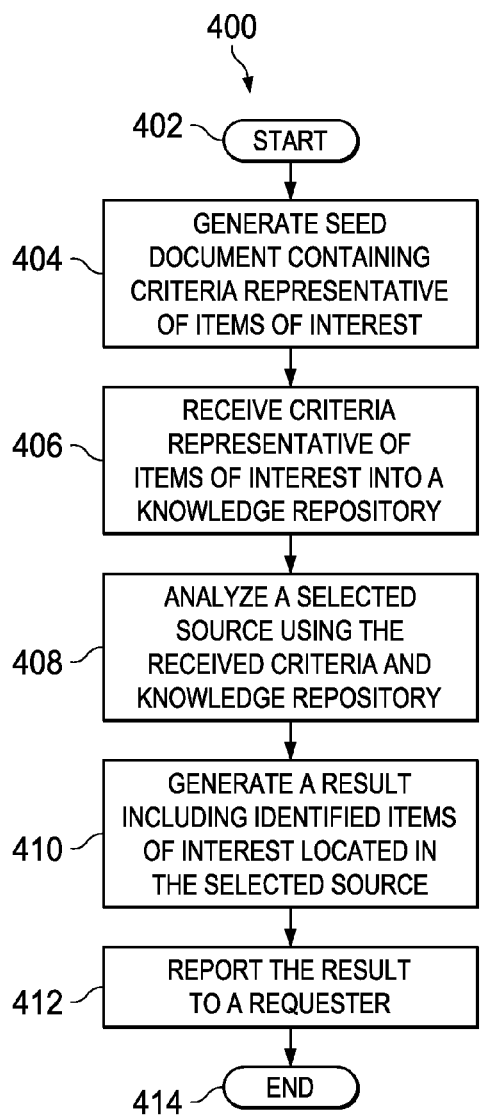
FIG. 4 is an example of flowchart of a process of programmatically identifying branding within assets in accordance with an illustrative embodiment.

With reference to FIG. 4 an example of a flowchart of a process of programmatically identifying brand indicia within assets in accordance with an illustrative embodiment is presented. The steps in example process 400 may be implemented in network data processing system 100 of FIG. 1. In particular the steps of the example process may be implemented in hardware, software or a combination thereof using computer system 102 of FIG. 1. The steps may also be implemented in server 104 of FIG. 1. Process 400 is an example of a process using computer system 102 of FIG. 1 to programmatically identify brand indicia within source material defined as assets.

Process 400 begins (step 402) and generates a seed document containing criteria representative of items of interest (step 404). The items of interest are associated with a particular entity, for example, a company or product line, representing a first company about to be purchased by a second company. The items of interest are associated with a brand or identity of the predetermined entity. In the example presented a purchase event was used to indicate a transfer of ownership; however a purchase is not the only type of event which may trigger an inquiry for items of interest. For example, a product group may decide to re-brand a product and perform the task to generate a seed document containing criteria representative of items of interest. The entity defines the scope of interest which is limited to a particular instance of branding indicia for a particular entity.

Process 400 receives the seed document containing the criteria representative of items of interest in to a repository, to initialize the repository (step 406). The repository comprises information describing brand indicia representative of the predetermined entity provided by the seed document for the predetermined entity, and other seed documents created and input previously.

Process 400 analyzes a selected source material using the criteria provided in the seed document in combination with information contained within the repository (step 408). The criteria representative of items of interest defines a scope for the analysis and the analysis further includes selectively applying an adapter associated with a specific type of content contained within a portion of the selected source material to perform analysis including semantic analysis and pattern matching. An adapter is applied to a respective portion of the selected source material being analyzed, wherein the selection and application of the particular adapter is driven by the data being analyzed. Process 400 generates a report (step 410). The report includes a set of identified items of interest, representative of the brand indicia associated with an identity of the predetermined entity, located in the selected source. Generating the report further includes linking an identified item of interest in the remaining set of identified items of interest in the filtered result to a corresponding document in the selected source in which the identified item of interest is located. Marking the identified item of interest in the remaining set of identified items of interest in the filtered result for review is also included in the process of generating the report. The review of marked items may then be used to imitate other analysis including bug reporting and corrective action modifying the previously used criteria, adapters and associated definitions.

Process 400 presents the report to a user (step 412) and terminates thereafter (step 414).

Figure 5:
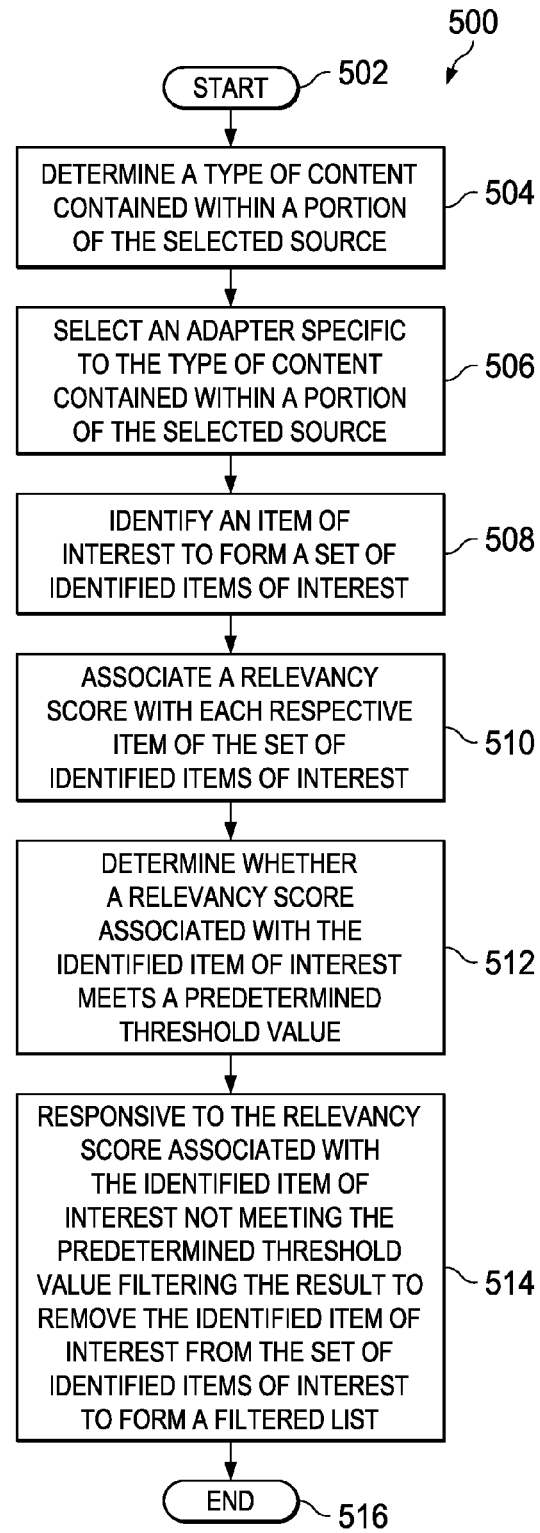
FIG. 5 is a flowchart of a process for creating a list of identified items using the process of FIG. 4 in accordance with an illustrative embodiment.

FIG. 5 is a flowchart of a process for creating a filtered list of identified items using the process of FIG. 4 in accordance with an illustrative embodiment. The steps in example process 500 may be implemented in network data processing system 100 of FIG. 1. In particular the steps of the example process may be implemented in hardware, software or a combination thereof using computer system 102 of FIG. 1. The steps may also be implemented in server 104 of FIG. 1. Process 500 is an example of a process using computer system 102 of FIG. 1 within process 400 of FIG. 4 used to generate a list of identified items of interest in a filtered result.

Process 500 begins (step 502) and determines a type of content contained within a portion of the selected source material (step 504). A type of content represents one of a group of types including text, image, graphic, audio, video, structured and unstructured.

Process 500 selects an adapter specific to the type of content contained within a portion of the selected source material (step 506). The adapter is selected from a group of adapters comprising a text adapter, an image adapter, a graphic adapter, an audio adapter, a video adapter, a structured adapter and an unstructured data adapter. Each adapter is tailored to support the particular type of data recognized during analysis of a particular portion of the input of source material during processing.

Process 500 identifies an item of interest to form a set of identified items of interest (step 508). An item of interest is determined by a relevancy of an item located in the source material based on a criteria derived from seed document 108 of FIG. 1.

Process 500 associates a relevancy score with each respective item of the set of identified items of interest (step 510). The relevancy score indicates a level of confidence that the respective item is representative of a corresponding item provided from branding indicia. For example, a relevancy score of 0 indicates a particular item is not a good match for a previously provided search criteria, whereas a relevancy score of 1 indicates a particular item is a very good match.

Process 500 determines whether a relevancy score associated with the identified item of interest meets a predetermined threshold value (step 512). For example, a threshold value of 7 indicates a reasonable level of confidence that the respective item is representative of a corresponding item provided from branding indicia. Responsive to the relevancy score associated with the identified item of interest not meeting the predetermined threshold value process 500 filters the result to remove the identified item of interest from the set of identified items of interest to form a filtered list (step 514) and terminates thereafter (step 516).

Figure 6:
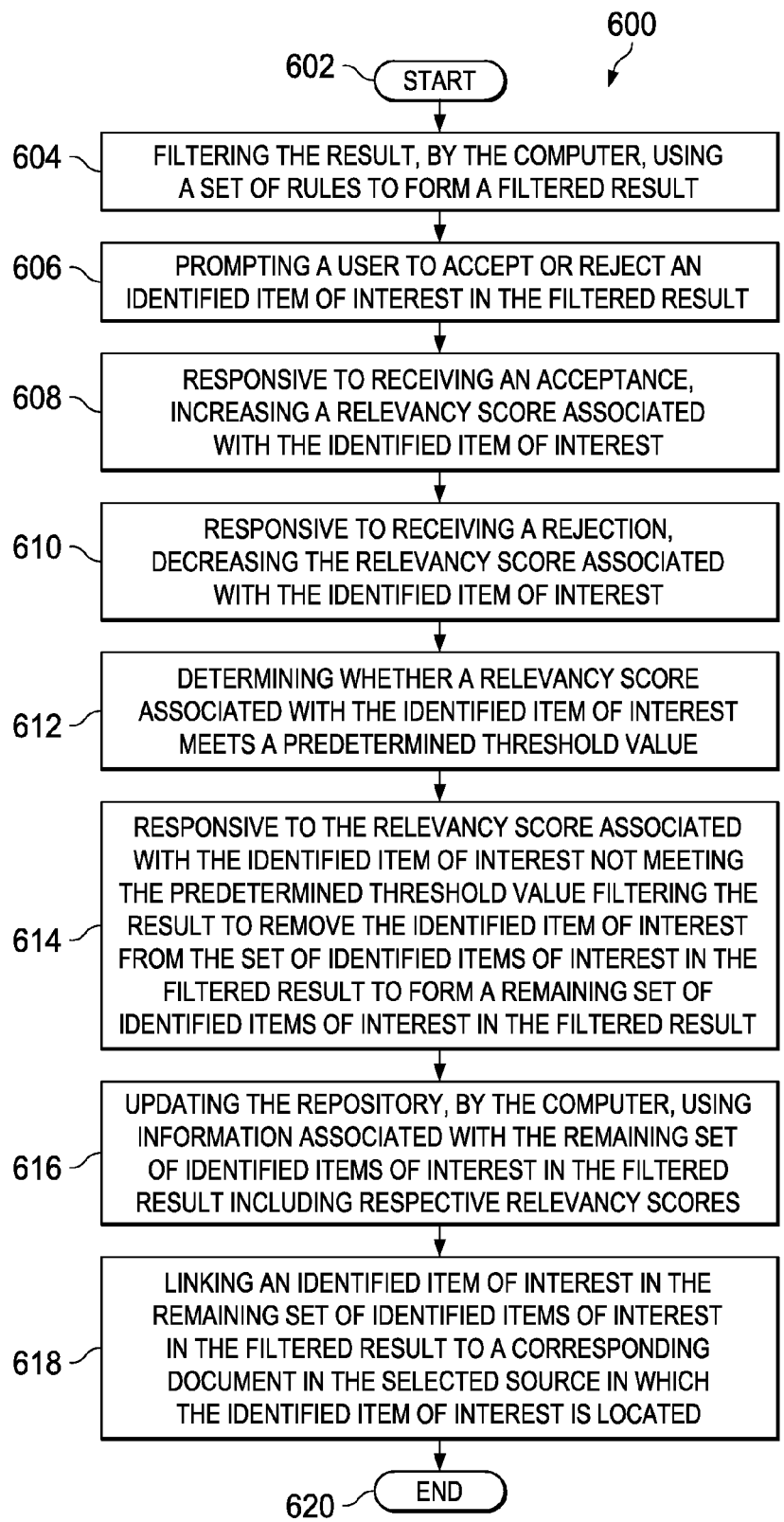
FIG. 6 is a flowchart of a process for refining the filtered list of FIG. 5 in accordance with an illustrative embodiment.

FIG. 6 is a flowchart of a process for refining the filtered list of FIG. 5 in accordance with an illustrative embodiment. The steps in example process 600 may be implemented in network data processing system 100 of FIG. 1. In particular the steps of the example process may be implemented in hardware, software or a combination thereof using computer system 102 of FIG. 1. The steps may also be implemented in server 104 of FIG. 1. Process 600 is an example of a process using computer system 102 of FIG. 1 within process 400 of FIG. 4 used to further refine the list of identified items of interest in the filtered result of process 500 of FIG. 5.

Process 600 begins (step 602) and filters the result using a set of rules to form a filtered result (step 604). Rules used in the processing provide a further capability to assess the semantic and relevance analysis performed in generating the initial list. For example, addition conditional logic may be applied including ranking elements of the list according to relevancy scores. In another example substitutions may be defined to enable coalescing of items.

Process 600 prompts a user to accept or reject an identified item of interest in the filtered result (step 606). Responsive to receiving an acceptance, process 600 increases a relevancy score associated with the identified item of interest (step 608). Process 600, responsive to receiving a rejection, decreases the relevancy score associated with the identified item of interest (step 610). In these steps process 600 enables a user to provide additional insight if desired by accepting or rejecting results of the analysis.

Process 600 determines whether a relevancy score associated with the identified item of interest meets a predetermined threshold value (step 612).

Responsive to the relevancy score associated with the identified item of interest not meeting the predetermined threshold value, process 600 filters the result to remove the identified item of interest from the set of identified items of interest in the filtered result to form a remaining set of identified items of interest in the filtered result (step 614).

Process 600 updates the repository using information associated with the remaining set of identified items of interest in the filtered result including respective relevancy scores (step 616). Process 600 links an identified item of interest in the remaining set of identified items of interest in the filtered result to a corresponding document in the selected source material in which the identified item of interest is located (step 618) and terminates thereafter (step 620).

Turning now to FIG. 7, an illustration of a data processing system is depicted in accordance with an illustrative embodiment. In this illustrative example, data processing system 700 includes communications fabric 702, which provides communications between processor unit 704, memory 706, persistent storage 708, communications unit 710, input/output (I/O) unit 712, and display 714. Data processing system 700 is an example of a data processing system that may be used to implement programmatic identification of branding within assets in a network data processing system. Data processing system 700 is also an example of a data processing system that may be used to implement the hardware and software components of computer system 102 in FIG. 1. Data processing system 700 may also be used to implement server 104 in FIG. 1. More particularly, data processing system 700 may be used to implement analysis engine 114 in computer system 102 in FIG. 1.

Processor unit 704 serves to process instructions for software that may be loaded into memory 706. Processor unit 704 may be a number of processors, a multi-processor core, or some other type of processor, depending on the particular implementation. "A number," as used herein with reference to an item, means one or more items. Further, processor unit 704 may be implemented using a number of heterogeneous processor systems in which a main processor is present with secondary processors on a single chip. As another illustrative example, processor unit 704 may be a symmetric multi-processor system containing multiple processors of the same type.

Memory 706 and persistent storage 708 are examples of storage devices 716. A storage device is any piece of hardware that is capable of storing information, such as, for example, without limitation, data, program code in functional form, and/or other suitable information either on a temporary basis and/or a permanent basis. Storage devices 716 may also be referred to as computer readable storage devices in these examples. Memory 706, in these examples, may be, for example, one or more of a random access memory or any other suitable volatile or non-volatile storage device. Persistent storage 708 may take various forms, depending on the particular implementation.

For example, persistent storage 708 may contain one or more components or devices. For example, persistent storage 708 may be a hard drive, a flash memory, a rewritable optical disk, a rewritable magnetic tape, or some combination of the above. The media used by persistent storage 708 also may be removable. For example, a removable hard drive may be used for persistent storage 708.

Communications unit 710, in these examples, provides for communications with other data processing systems or devices. In these examples, communications unit 710 is a network interface card. Communications unit 710 may provide communications through the use of either or both physical and wireless communications links.

Input/output unit 712 allows for input and output of data with other devices that may be connected to data processing system 700. For example, input/output unit 712 may provide a connection for user input through a keyboard, a mouse, and/or some other suitable input device. Further, input/output unit 712 may send output to a printer. Display 714 provides a mechanism to display information to a user.

Instructions for the operating system, applications, and/or programs may be located in storage devices 716, which are in communication with processor unit 704 through communications fabric 702. In these illustrative examples, the instructions are in a functional form on persistent storage 708. These instructions may be loaded into memory 706 for processing by processor unit 704. The processes of the different embodiments may be performed by processor unit 704 using computer-implemented instructions, which may be located in a memory, such as memory 706.

These instructions are referred to as program code, computer usable program code, computer executable instructions or computer readable program code that may be read and processed by a processor in processor unit 704. The program code in the different embodiments may be embodied on different physical or computer readable storage media, such as memory 706 or persistent storage 708.

Program code 718 is located in a functional form on computer readable media 720 that is selectively removable and may be loaded onto or transferred to data processing system 700 for processing by processor unit 704. Program code 718 and computer readable media 720 form computer program product 722 in these examples. In one example, computer readable media 720 may be computer readable storage media 724 or computer readable signal media 726.

Computer readable storage media 724 may include, for example, an optical or magnetic disk that is inserted or placed into a drive or other device that is part of persistent storage 708 for transfer onto a storage device, such as a hard drive, that is part of persistent storage 708. Computer readable storage media 724 also may take the form of a persistent storage, such as a hard drive, a thumb drive, or a flash memory, that is connected to data processing system 700.

In some instances, computer readable storage media 724 may not be removable from data processing system 700. In these examples, computer readable storage media 724 is a physical or tangible storage device used to store program code 718 rather than a medium that propagates or transmits program code 718. Computer readable storage media 724 is also referred to as a computer readable tangible storage device or a computer readable physical storage device. In other words, computer readable storage media 724 is media that can be touched by a person.

Alternatively, program code 718 may be transferred to data processing system 700 using computer readable signal media 726. Computer readable signal media 726 may be, for example, a propagated data signal containing program code 718. For example, computer readable signal media 726 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 718 may be downloaded over a network to persistent storage 708 from another device or data processing system through computer readable signal media 726 for use within data processing system 700. For instance, program code stored in a computer readable storage medium in a server data processing system may be downloaded over a network from the server to data processing system 700. The data processing system providing program code 718 may be a server computer, a client computer, a remote data processing system, or some other device capable of storing and transmitting program code 718. For example, program code stored in the computer readable storage medium in data processing system 700 may be downloaded over a network from the remote data processing system to the computer readable storage medium in data processing system 700. Additionally, program code stored in the computer readable storage medium in the server computer may be downloaded over the network from the server computer to a computer readable storage medium in the remote data processing system.

The different components illustrated for data processing system 700 are not meant to provide architectural limitations to the manner in which different embodiments may be implemented. The different illustrative embodiments may be implemented in a data processing system including components in addition to and/or in place of those illustrated for data processing system 700. Other components shown in FIG. 7 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, processor unit 704 may take the form of a hardware unit that has circuits that are manufactured or configured for a particular use. This type of hardware may perform operations without needing program code to be loaded into a memory from a storage device to be configured to perform the operations.

For example, when processor unit 704 takes the form of a hardware unit, processor unit 704 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, a programmable array logic device, a field programmable logic array, a field programmable gate array, and other suitable hardware devices. With this type of implementation, program code 718 may be omitted, because the processes for the different embodiments are implemented in a hardware unit.

In still another illustrative example, processor unit 704 may be implemented using a combination of processors found in computers and hardware units. Processor unit 704 may have a number of hardware units and a number of processors that are configured to run program code 718. With this depicted example, some of the processes may be implemented in the number of hardware units, while other processes may be implemented in the number of processors.

In another example, a bus system may be used to implement communications fabric 702 and may be comprised of one or more buses, such as a system bus or an input/output bus. Of course, the bus system may be implemented using any suitable type of architecture that provides for a transfer of data between different components or devices attached to the bus system.

Additionally, communications unit 710 may include a number of devices that transmit data, receive data, or transmit and receive data. Communications unit 710 may be, for example, a modem or a network adapter, two network adapters, or some combination thereof. Further, a memory may be, for example, memory 706, or a cache, such as found in an interface and memory controller hub that may be present in communications fabric 702.

Thus, illustrative embodiments of the present invention provide a computer implemented process, computer system, and computer program product for identifying an item within a set of items. In one illustrative embodiment a computer implemented process generates a seed document containing criteria representative of items of interest associated with a predetermined entity, wherein the items of interest are representative of branding indicia associated with an identity of the predetermined entity. The computer implemented process receives the seed document containing the criteria into a repository to initialize the repository, wherein the repository comprises information describing branding indicia representative of the predetermined entity.

The computer implemented process analyzes a selected source material using the criteria in the seed document in combination with the repository, wherein the criteria defines a scope for the analysis and the analysis further includes selectively applying an adapter associated with a specific type of content contained within a portion of the selected source to perform analysis including semantic analysis and pattern matching. The analysis also includes techniques comprising use of semantic analysis and pattern matching to aid in identification of items.

The computer implemented process generates a report wherein the report includes a set of identified items of interest, representative of the branding indicia associated with an identity of the predetermined entity, located in the selected source and presents the report, by a computer, to a user.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components but do not preclude the presence or addition of one or more other features, integers, steps, operations, elements, components, and/or groups thereof.

Thus, the illustrative embodiments provide a method, apparatus, and computer program product for programmatic identification of branding within assets in a network data processing system.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A process for reporting identified items of interest associated with a brand associated with an identity of an entity, the process comprising:
   generating, by a computer, a seed document containing criteria representative of items of interest representative of a brand associated with an identity of a selected entity, wherein the items of interest are associated with the identity of the selected entity by a policy for associating items of interest with brand indicia of predetermined entities;
   receiving, by the computer, the seed document containing the criteria into a repository to initialize the repository, wherein the repository comprises information describing brand indicia representative of the selected entity;
   analyzing, by the computer, a selected source material using the criteria in the seed document in combination with the repository, by selectively applying adapters associated with specific types of content contained within the selected source material to perform analysis including semantic analysis and pattern matching;
   responsive to the analysis, the computer identifying a set of items of interest in the selected source material that meet the criteria representative of items of interest associated with the selected entity to form an identified set of items of interest; and
   generating a report wherein the report includes the identified set of items of interest, by the computer by:
   filtering a result, by the computer, using a set of rules to form a filtered result;
   prompting a user, by the computer, to accept or reject an identified item of interest in the filtered result;
   responsive to receiving an acceptance, the computer increasing a relevancy score associated with the identified item of interest;
   responsive to receiving a rejection, the computer decreasing the relevancy score associated with the identified item of interest;
   determining, by the computer, whether a relevancy score associated with the identified item of interest meets a predetermined threshold value;
   responsive to the relevancy score associated with the identified item of interest not meeting the predetermined threshold value, the computer filtering the result to remove the identified item of interest from the identified set of items of interest in the filtered result to form a remaining set of identified items of interest in the filtered result;
   linking an identified item of interest in the remaining set of identified items of interest in the filtered result, by the computer, to a corresponding document in the selected source in which the identified item of interest is located;
   marking the identified item of interest in the remaining set of identified items of interest in the filtered result for review; and
   updating the repository, by the computer, using information associated with the remaining set of identified items of interest in the filtered result including respective relevancy scores.

2. The process of claim 1, wherein the criteria representative of items of interest further comprises:
   indicia representative of the brand associated with the identity of the selected entity, wherein the indicia comprises elements including keywords, images, graphics, symbols and metadata associated with respective elements including collocation information associated with the keywords.

3. The process of claim 1, wherein selectively applying adapters associated with the specific types of content contained within the selected source material further comprises:
   selecting, by the computer, an adapter from a set of adapters comprising a text adapter, a voice adapter, an image adapter, a graphic adapter, a programming language specific adapter, a binary adapter and a non-structured content adapter.

4. The process of claim 1, wherein generating the report further comprises:
   determining, by the computer, whether a relevancy score associated with the identified item of interest meets a predetermined threshold value; and
   responsive to the relevancy score associated with the identified item of interest not meeting the predetermined threshold value, filtering, by the computer, a result to remove the identified item of interest from the identified set of items of interest.

5. The process of claim 1, wherein generating the report, further comprises:
   associating a relevancy score, by the computer, with each respective item of the identified set of items of interest, according to a degree of confidence associated with the analysis of the selected source, for each item of the identified set of items of interest.

6. The process of claim 1, wherein the item of interest is determined by a relevancy of an item located in a source material based on criteria derived from the seed document.

7. The process of claim 1 further comprising:
   reviewing of the marked items to imitate other analysis including bug reporting and corrective action modifying previously used criteria, adapters and associated definitions.

8. A computer program product for reporting identified items of interest associated with a brand associated with an identity of an entity, the computer program product comprising:
   a computer readable storage medium having computer readable program code embodied thereon, the computer readable program code comprising:
   computer readable program code for generating, by a computer, a seed document containing criteria representative of items of interest representative of a brand associated with an identity of a selected entity, wherein the items of interest are associated with the identity of the selected entity by a policy for associating items of interest with brand indicia of predetermined entities;
   computer readable program code for receiving, by the computer, the seed document containing the criteria into a repository to initialize the repository, wherein the repository comprises information describing brand indicia representative of the selected entity;
   computer readable program code for analyzing, by the computer, a selected source material using the criteria in the seed document in combination with the repository, by selectively applying adapters associated with specific types of content contained within the selected source material to perform analysis including semantic analysis and pattern matching;

computer readable program code responsive to the analysis, for identifying, by the computer, a set of items of interest in the selected source material that meet the criteria representative of items of interest associated with the selected entity to form an identified set of items of interest; and computer readable program code for generating, by the computer, a report wherein the report includes the identified set of items of interest, and wherein the computer readable program code for generating further comprises computer readable program code for:

filtering a result, by the computer, using a set of rules to form a filtered result;

prompting a user, by the computer, to accept or reject an identified item of interest in the filtered result;

responsive to receiving an acceptance, the computer increasing a relevancy score associated with the identified item of interest;

responsive to receiving a rejection, the computer decreasing the relevancy score associated with the identified item of interest;

determining, by the computer, whether a relevancy score associated with the identified item of interest meets a predetermined threshold value;

responsive to the relevancy score associated with the identified item of interest not meeting the predetermined threshold value, the computer filtering the result to remove the identified item of interest from the identified set of items of interest in the filtered result to form a remaining set of identified items of interest in the filtered result;

linking an identified item of interest in the remaining set of identified items of interest in the filtered result, by the computer, to a corresponding document in the selected source in which the identified item of interest is located;

marking the identified item of interest in the remaining set of identified items of interest in the filtered result for review; and updating the repository, by the computer, using information associated with the remaining set of identified items of interest in the filtered result including respective relevancy scores.

9. The computer program product of claim 8, wherein the criteria representative of items of interest further comprises:

indicia representative of the brand associated with the identity of the selected entity, wherein the indicia comprises elements including keywords, images, graphics, symbols and metadata associated with respective elements including collocation information associated with the keywords.

10. The computer program product of claim 8, wherein computer readable program code for selectively applying adapters associated with the specific types of content contained within the selected source material further comprises:

computer readable program code for selecting, by the computer, an adapter from a set of adapters comprising a text adapter, a voice adapter, an image adapter, a graphic adapter, a programming language specific adapter, a binary adapter and a non-structured content adapter.

11. The computer program product of claim 8, wherein computer readable program code for generating the report further comprises:

computer readable program code for determining, by the computer, whether a relevancy score associated with the identified item of interest meets a predetermined threshold value; and computer readable program code responsive to the relevancy score associated with the identified item of interest not meeting the predetermined threshold value, for filtering, by the computer, a result to remove the identified item of interest from the identified set of items of interest.

12. The computer program product of claim 8, wherein computer readable program code generating the report, further comprises:

computer readable program code for associating a relevancy score, by the computer, with each respective item of the identified set of items of interest, according to a degree of confidence associated with the analysis of the selected source, for each item of the identified set of items of interest.

13. The computer program product of claim 8, wherein the item of interest is determined by a relevancy of an item located in a source material based on criteria derived from the seed document.

14. The computer program product of claim 8, further comprising:

computer readable program code for reviewing of the marked items to imitate other analysis including bug reporting and computer readable program code for corrective action modifying previously used criteria, adapters and associated definitions.

15. A apparatus for reporting identified items of interest associated with a brand associated with an identity of an entity, the apparatus comprising:

a bus;

one or more storage devices connected to the bus, wherein at least one of the one or more storage devices contains computer readable program code stored thereon;

a communications unit connected to the bus; and a processor unit, wherein the processor unit executes the computer readable program code to direct the apparatus to:

generate a seed document containing criteria representative of items of interest representative of a brand associated with an identity of a selected entity, wherein the items of interest are associated with the identity of the selected entity by a policy for associating items of interest with brand indicia of predetermined entities;

receive the seed document containing the criteria into a repository to initialize the repository, wherein the repository comprises information describing brand indicia representative of the selected entity;

analyze a selected source material using the criteria in the seed document in combination with the repository, by selectively applying adapters associated with specific types of content contained within the selected source material to perform analysis including semantic analysis and pattern matching;

identify, responsive to the analysis, a set of items of interest in the selected source material that meet the criteria representative of items of interest associated with the selected entity to form an identified set of items of interest; and generate a report, wherein the report includes the identified set of items of interest wherein the processor unit further executes the computer readable program code to direct the apparatus to:

filter a result, by the computer, using a set of rules to form a filtered result;

prompt a user, by the computer, to accept or reject an identified item of interest in the filtered result;

responsive to receiving an acceptance, increase a relevancy score associated with the identified item of interest;

responsive to receiving a rejection, decrease the relevancy score associated with the identified item of interest;

determine whether a relevancy score associated with the identified item of interest meets a predetermined threshold value;

responsive to the relevancy score associated with the identified item of interest not meeting the predetermined threshold value, filter the result to remove the identified item of interest from the identified set of items of interest in the filtered result to form a remaining set of identified items of interest in the filtered result;

link an identified item of interest in the remaining set of identified items of interest in the filtered result to a corresponding document in the selected source in which the identified item of interest is located;

mark the identified item of interest in the remaining set of identified items of interest in the filtered result for review; and update the repository using information associated with the remaining set of identified items of interest in the filtered result including respective relevancy scores.

16. The apparatus of claim 15, wherein the criteria representative of items of interest further comprises:
indicia representative of the brand associated with the identity of the selected entity, wherein the indicia comprises elements including keywords, images, graphics, symbols and metadata associated with respective elements including collocation information associated with the keywords.

17. The apparatus of claim 15, wherein the processor unit executes the computer readable program code to selectively apply adapters associated with the specific types of content contained within the selected source material further directs the apparatus to:
select an adapter from a set of adapters comprising a text adapter, a voice adapter, an image adapter, a graphic adapter, a programming language specific adapter, a binary adapter and a non-structured content adapter.

18. The apparatus of claim 15, wherein the processor unit executes the computer readable program code to generate the report further directs the apparatus to:
determine whether a relevancy score associated with the identified item of interest meets a predetermined threshold value; and
responsive to the relevancy score associated with the identified item of interest not meeting the predetermined threshold value, filter a result to remove the identified item of interest from the identified set of items of interest.

19. The apparatus of claim 15, wherein the item of interest is determined by a relevancy of an item located in a source material based on criteria derived from the seed document.

20. The apparatus of claim 15, wherein the processor unit executes the computer readable program code to generate the report further directs the apparatus to:
review the marked items to imitate other analysis including bug reporting and corrective action modifying previously used criteria, adapters and associated definitions.

* * * * *